United States Patent [19]

Miller et al.

[11] Patent Number: 4,504,857
[45] Date of Patent: Mar. 12, 1985

[54] GYRO-COMPASS POSITIONING APPARATUS

[75] Inventors: Clyde Miller; Joe Hunt; Mark Wagner, all of Houston, Tex.

[73] Assignee: Martech International, Houston, Tex.

[21] Appl. No.: 415,176

[22] Filed: Sep. 7, 1982

[51] Int. Cl.³ .............................................. H04N 7/18
[52] U.S. Cl. .................................... 358/99; 358/100; 354/64; 405/158; 405/170; 33/324
[58] Field of Search .................... 358/99, 100, 103; 354/64; 405/158, 169, 170; 33/316, 324

[56] References Cited

U.S. PATENT DOCUMENTS

| 3,199,613 | 8/1965 | Malott et al. | 358/99 |
| 3,227,804 | 1/1966 | Johnson | 358/99 |
| 3,780,220 | 12/1973 | Fugitt et al. | 358/99 |
| 3,788,730 | 1/1974 | Greenleaf | 350/179 |
| 3,916,094 | 10/1975 | Marrone | 358/99 |
| 4,031,544 | 6/1977 | Lapetina | 358/99 |
| 4,175,269 | 11/1979 | Rebikoff | 358/99 |
| 4,281,343 | 7/1981 | Montgiro | 358/99 |

Primary Examiner—Howard W. Britton
Assistant Examiner—John K. Peng
Attorney, Agent, or Firm—Bernard A. Reiter

[57] ABSTRACT

A gyro compass positioning apparatus is disclosed for use in lowering and accurately orienting a first object such as an underwater pipeline junction manifold to the floor of a body of water. The gyro compass positioning apparatus comprises a north seeking gyro compass in combination with a closed circuit television camera, all enclosed in a pressure housing. The closed circuit television camera is mounted above the north seeking gyro compass such that it is continuously viewing the orientation of the needle of the compass and displaying this orientation on a television monitor which is located on the surface ship. The first object or underwater pipeline junction manifold is attached to the bottom of the pressure housing by a mounting bracket and in predetermined orientation thereto. Means may be provided for supplying power to the north seeking gyro compass and to the closed circuit television camera and monitor through an umbilical cable as the apparatus and first object are lowered to a predetermined position on the floor of the body of water, where a second object, such as a pipeline is located.

16 Claims, 1 Drawing Figure

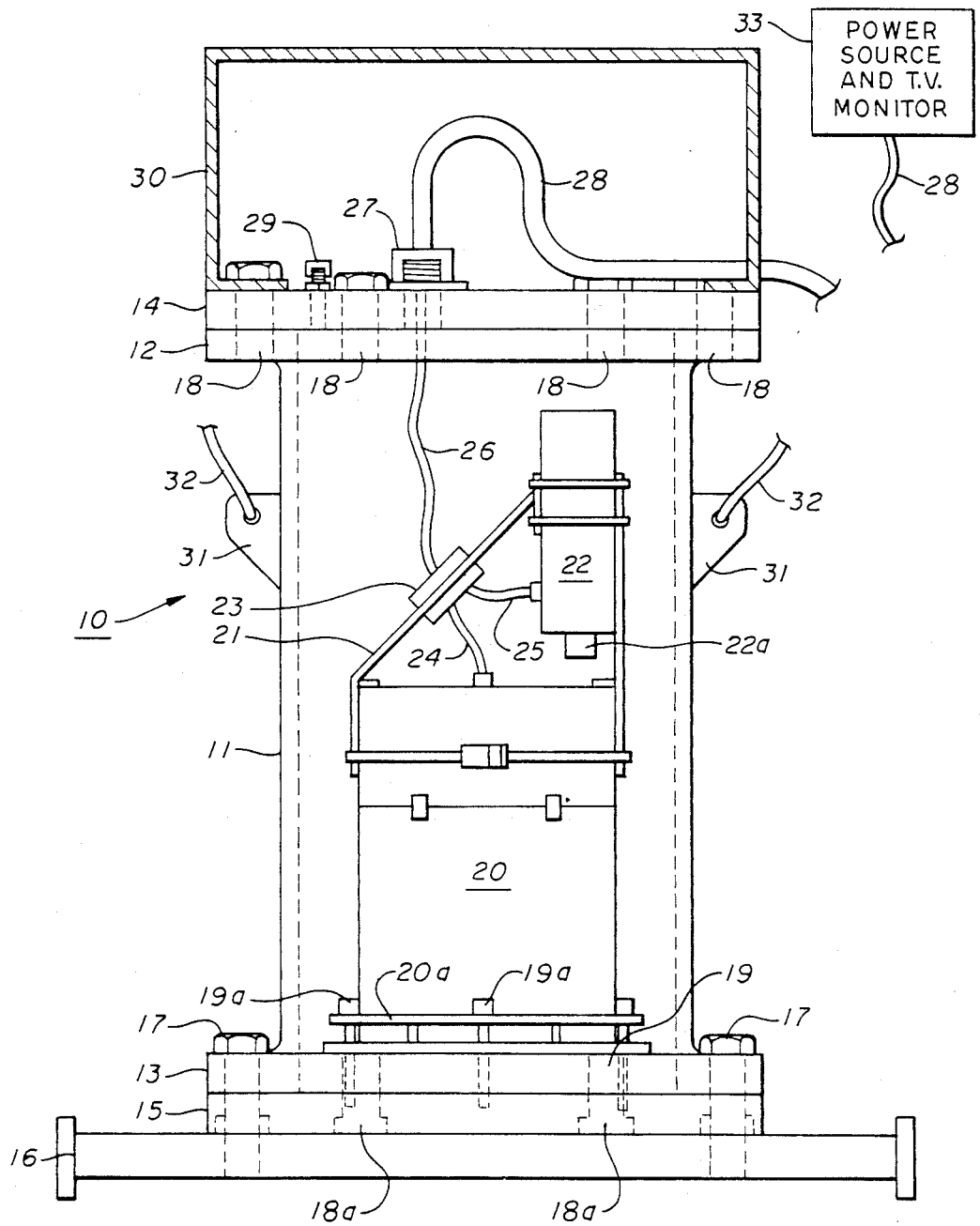

4,504,857

GYRO-COMPASS POSITIONING APPARATUS

BACKGROUND OF THE INVENTION

This invention relates to underwater pipelines and more particularly to underwater pipeline junction manifolds and means for accurately orienting the manifold to existing pipelines on the ocean floor.

Underwater pipeline junctions manifolds are used in the offshore drilling industry to join pipelines from several wells to a common point. The various pipelines run to the junction manifold from the respective wells arriving at the manifold at different angles. A main pipeline then runs from the junction manifold to on-shore facilities or to a deep water port distribution system. The junction manifold is fabricated and constructed with flanges to receive the incoming pipelines at these different angles. When placing the junction manifold on the ocean floor, it is necessary to orient the manifold relative to the incoming pipelines so that the pipelines will line up with the flanges on the manifold.

Heretofore, a number of methods have been used in attempts to install and orient the manifold. This may become increasingly difficult to do accurately in deep water, or when the manifold itself is relatively small, particularly if an acoustic type descent and locating method is used. In the acoustic method, an acoustic transmitter is on the manifold, while another is placed at a known location on the sea floor. Radio signals from the two transmitters are received and displayed on an oscilloscope on board a ship. As the manifold is lowered, the relative position of the two transmitting signals can be measured, since one is coming from a fixed known location. This method, though frequently satisfactory, is not entirely reliable, particularly when the manifold is relatively small and/or when it is being installed in deep water.

Also, it does not satisfactorily provide for confident orientation-direction of the manifold.

Thus, the present invention relates to an apparatus for accurately positioning and orienting an underwater pipeline junction manifold relative to existing underwater pipelines. More particularly, the present invention relates to an apparatus and method for installing a manifold of small size and/or any manifold in relatively deep water of up to one thousand (1,000) feet or more.

SUMMARY OF THE INVENTION

The gyro compass positioning apparatus described herein comprises a pressure housing sealed at both ends enclosing a north seeking gyro compass positioned within the interior of the pressure housing. A television camera is mounted above the north seeking gyro compass such that the needle of the compass is displayed on a remote television monitor located on the surface ship. Electrical control lines communicate from a power source and the monitor on the surface ship to the pressure housing by means of an umbilical cable. The underwater pipeline junction manifold to be positioned on the ocean floor is attached to the bottom of the pressure housing. When the manifold is positioned on the ocean floor, the remote television monitor displays the orientation of the compass and thus the orientation of the manifold. The housing can then be rotated to the exact orientation required by divers or by remote propulsion means. Once the correct orientation is obtained, the manifold is disconnected from the pressure housing and thus accurately positioned on the ocean floor.

Numerous objects and advantages of this invention will become apparent from the following description taken in connection with the accompanying drawing, wherein is set forth by way of illustration an example of the preferred embodiment of the invention.

BRIEF DESCRIPTION OF THE DRAWING

FIG. 1 is a partially sectional view of the gyro compass positioning apparatus according to the present invention.

DESCRIPTION OF THE PREFERRED EMBODIMENT

Referring to FIG. 1, a gyro compass positioning apparatus is illustrated generally as reference numeral 10, comprising a pressure housing main body 11 having an upper flange 12 and a lower flange 13 on its ends. A pressure housing top 14 is positioned on the upper flange 12 and secured in a sealing relationship by bolts 18. A first mounting bracket 15 is secured to the lower flange 13 in a sealing relationship by bolts 18a. The underwater pipeline junction manifold 16 to be placed on the ocean floor is secured to the first mounting bracket by removable bolt 17. It is necessary that there exist a fixed and known orientation-relation between the manifold and the compass. Therefore, an indicia, mark or the like may be placed on the manifold 16 so that the reading from the compass will accurately reveal the exact position of the manifold and hence the relative angular relation of its flanges which are to couple to preexisting angularly related positions of the underwater pipelines. A second mounting bracket 19 is secured in the first mounting bracket 15 by bolts 19a. A retaining bracket 20a is affixed to the bolts 19a in order to receive and hold a north seeking gyro compass 20 in a fixed position within the pressure housing main body 11. Attached to the north seeking gyro compass 20 is a camera mounting bracket 21 which holds a television camera 22 having a lens 22a focusing on the needle of the north seeking gyro compass 20. An electrical common terminal strip 23 is rigidly attached to the camera bracket 21 to receive the electrical compass control wire 24 and the electrical camera control wire 25. An electrical main control cable 26 communicates from the electrical common terminal strip 23 and runs to a power source and television monitor 33 located on the surface ship by means of a protective umbilical cable 28. A water tight electrical connector 27 is positioned on the pressure top housing 14 to receive the protective umbilical cable 28 and to communicate the electrical main control cable 26 to the electrical common terminal strip 23. When the gyro compass positioning apparatus is raised from the ocean floor, there exists a differential in pressure between the interior of the pressure housing main body 11 and the atmosphere. A vent 29 is provided and attached to the pressure housing top 14 to equalize this differential in pressure caused by raising the gyro compass positioning apparatus from the ocean floor. A protective guard 30 is provided and attached to the pressure housing top 14 by bolts 18 to provide protection to the umbilical cable 28 and the water tight electrical connector 27. To lower and raise the gyro compass positioning apparatus, a plurality of lifting brackets 31 are rigidly attached to the pressure housing main body 11 to accomodate a lifting cable 32.

In operation, the underwater pipeline junction manifold is attached to the first mounting bracket 15 by bolts 17. The gyro compass positioning apparatus 10 is lowered to its approximate position on the ocean floor by the lifting cable 32. Once in position on the ocean floor, the television camera 22 is turned to thus display the orientation of the north seeking gyro compass on the television monitor 33. The fixed relation between the manifold and gyro compass positioning apparatus manifestly thus reveals the exact orientation of the manifold. The gyro compass positioning apparatus is then rotated to the desired angle by conventional propulsion means. Once the desired position and orientation is obtained, the bolts 17 are removed by divers or otherwise, thus allowing the underwater pipeline junction manifold 16 to rest in the correct orientation to receive the incoming pipelines.

While the invention has been described with reference to a preferred embodiment, it will be obvious to one skilled in the art that modifications and variations of the invention may be constructed and employed without departing from the scope of the invention. For example, the invention hereof will find use as a locating apparatus and method for sub sea templates or for substantially any other object to be lowered into water, positioned on the floor and oriented properly thereat. The scope of the invention is defined in the following claims.

I claim:

1. In combination with an underwater pipeline junction manifold, a gyro compass positioning apparatus for lowering and accurately orienting an underwater pipeline junction manifold to the ocean floor, comprising:
   a pressure housing having an upper flange on one end and a lower flange on its other end;
   a pressure housing top securely attached to the upper flange forming a water tight seal;
   a mounting bracket securely attached to the lower flange and forming a water tight seal;
   means attaching said underwater pipeline junction manifold to said mounting bracket in fixed and known angular relation thereto;
   means for determining the degree of orientation of said apparatus from true north;
   means for observing said determining means from a remote location above the sea surface so that the angular disposition of said underwater pipeline junction manifold on the sea floor may be viewed and accurately arranged;
   means for lowering said apparatus to the ocean floor to thus place and orient said pipeline junction manifold in a predetermined and desired position.

2. The apparatus as defined in claim 1 further comprising:
   a second mounting bracket secured to said first mounting bracket having a retaining bracket attached thereto and positioned within the interior of said pressure housing;
   a north seeking gyro compass mounted within the interior of said pressure housing to said retaining bracket to secure said north seeking gyro compass within the interior of said pressure housing.

3. The apparatus as defined in claim 2, said observing means comprising:
   a camera mounting bracket secured to said north seeking gyro compass;
   a television camera rigidly attached to said camera mounting bracket and positioned so that said television camera will view the orientation of said north seeking gyro compass;
   a power supplying means for supplying electrical power to said television camera and said north seeking gyro compass.

4. The apparatus as defined in claim 3, said power supplying means comprising:
   an electrical common terminal strip rigidly attached to the camera mounting bracket;
   an electrical compass control wire communicating from said north seeking gyro compass to said electrical common terminal strip;
   an electrical camera control wire communicating from said television camera to said electrical common terminal strip;
   a power source remotely located from said pressure housing for supplying power to said north seeking gyro compass and said television camera;
   a water tight electrical connector rigidly attached to the pressure housing top;
   a protective umbilical cable communicating from said water tight electrical connector to said power source;
   an electrical main control cable communicating from said electrical common terminal strip and through said protective umbilical cable to said power source.

5. The apparatus as defined in claim 4, said observing means further comprising:
   a television monitor remotely positioned from said pressure housing main body and communicating with said television camera through said electrical main control cable so that the orientation of said north seeking gyro compass will be displayed on said television monitor.

6. The apparatus as defined in claim 5, said attaching means further comprising:
   a plurality of bolts threadably engaging said underwater pipeline junction manifold and positioned through said lower flange and through said first mounting bracket.

7. The apparatus as defined in claim 6, said lowering and raising means comprising:
   a plurality of lifting brackets securely attached to said pressure housing;
   a lifting cable securely attached to said plurality of lifting brackets for raising and lowering said gyro, compass positioning apparatus.

8. The apparatus as defined in claim 7 further comprising:
   means for venting the interior of said pressure housing so that when said gyro compass positioning apparatus is raised to the surface the pressure within the interior of said pressure housing main boy will equalize with the atmospheric pressure.

9. The apparatus as defined in claim 8 further comprising:
   a protective guard rigidly attached to said pressure housing top and positioned over said water tight electrical connector.

10. The method for lowering and remotely positioning a first object on the floor of a body of water in predetermined angular relation to a second object resting in a known preexisting position and orientation thereat;
    preparing a housing having a gyroscope mounted therein and a remotely surface controlled television camera trained thereon so as to transmit orientation to the surface monitor;

affixing said first object to the housing in predetermined orientation with respect thereto;

lowering the housing and first object to the floor of the body of water while monitoring the position and orientation thereof;

positioning the first object in predetermined relation to said second object; and removing the housing from the first object to thereby achieve remotely controlled placement thereof in relation to the second object.

11. A gyro compass positioning apparatus for lowering and accurately orienting an underwater pipeline junction manifold on the ocean floor comprising:

a watertight pressure housing;

means for attaching said pressure housing to the pipeline junction manifold in fixed and known angular relation thereto;

means for determining the degree of orientation of said main housing from true north;

a video camera mounted within said pressure housing directed at said determining means transmitting to a remote television means so that the orientation of the pipeline junction manifold may be viewed from a location at or above the ocean surface;

means for lowering said pressure housing as attached to the pipeline junction manifold to the sea floor.

12. An apparatus as recited in claim 11, wherein:
said determining means is a north seeking gyro compass located within said pressure housing.

13. An apparatus as recited in claim 12, wherein:
said means for attaching said pressure housing to the pipeline junction manifold comprises a plurality of brackets affixed to said pressure housing and the pipeline junction manifold by a plurality of bolts so that said pressure housing may be non-destructively removed from the pipeline junction manifold after it has been properly positioned on the ocean floor.

14. In combination with an underwater pipeline junction manifold, a gyro compass positioning apparatus for lowering and accurately orienting said underwater junction manifold on the sea floor comprising:

a watertight pressure housing;

means for attaching said main housing to said pipeline junction manifold in fixed and known angular relation thereto;

means for determining the degree of orientation of said pressure housing from true north;

a video camera mounted within said pressure housing directed at said determining means transmitting to a remote television means so that the orientation of said pipeline junction manifold may be viewed from a location at or above the ocean surface;

means for lowering said pressure housing as attached to said pipeline junction manifold to the sea floor.

15. An apparatus as rectied in claim 14, wherein:
said determining means is a north seeking gyro compass located within said pressure housing.

16. An apparatus as recited in claim 15, wherein:
said means for attaching said pressure housing to said pipeline junction manifold comprises a plurality of brackets affixed to said pressure housing and said pipeline junction manifold by a plurality of bolts so that said pressure housing may be non-destructively removed from said pipeline junction manifold after it has been properly positioned on the ocean floor.

* * * * *